US011988111B2

(12) United States Patent
Patel et al.

(10) Patent No.: US 11,988,111 B2
(45) Date of Patent: May 21, 2024

(54) METHOD FOR REFITTING BLADE SHROUDS OF A ROTOR WHEEL IN AN AIRCRAFT TURBOMACHINE

(71) Applicant: SAFRAN AIRCRAFT ENGINES, Paris (FR)

(72) Inventors: Vijeay Patel, Moissy-Cramayel (FR); Robert Fiarda, Moissy-Cramayel (FR); Etienne Léon Francois, Moissy-Cramayel (FR); Bruno Marc-Etienne Loisel, Moissy-Cramayel (FR); Camille Maryse Martine Palomba, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/796,305

(22) PCT Filed: Mar. 1, 2021

(86) PCT No.: PCT/FR2021/050341
§ 371 (c)(1),
(2) Date: Jul. 29, 2022

(87) PCT Pub. No.: WO2021/176168
PCT Pub. Date: Sep. 10, 2021

(65) Prior Publication Data

US 2023/0091418 A1 Mar. 23, 2023

(30) Foreign Application Priority Data

Mar. 4, 2020 (FR) ....................................... 2002179

(51) Int. Cl.

| | |
|---|---|
| ***F01D 5/22*** | (2006.01) |
| ***F01D 5/16*** | (2006.01) |
| ***F01D 11/08*** | (2006.01) |

(52) U.S. Cl.
CPC ............... *F01D 5/225* (2013.01); *F01D 5/16* (2013.01); *F01D 11/08* (2013.01);
(Continued)

(58) Field of Classification Search
CPC ............. F05D 2240/24; F05D 2260/80; F05D 2220/323; F05D 2230/80; F01D 11/08; F01D 21/003; F01D 5/225; F01D 5/16
See application file for complete search history.

(56) References Cited

U.S. PATENT DOCUMENTS

| | | | | |
|---|---|---|---|---|
| 4,840,539 | A | 6/1989 | Bourcier et al. | |
| 2004/0133075 | A1* | 7/2004 | Motoki ............. | A61B 1/00147 600/153 |
| 2017/0157719 | A1* | 6/2017 | Diwinsky ............... | F01D 25/24 |

FOREIGN PATENT DOCUMENTS

| | | | |
|---|---|---|---|
| EP | 0 284 829 | A1 | 10/1988 |
| EP | 1 873 355 | A1 | 1/2008 |

(Continued)

OTHER PUBLICATIONS

International Search Report mailed Jun. 14, 2021, issued in corresponding International Application No. PCT/FR2021/050341, filed Mar. 1, 2021, 6 pages.

(Continued)

*Primary Examiner* — Moshe Wilensky
(74) *Attorney, Agent, or Firm* — CHRISTENSEN O'CONNOR JOHNSON KINDNESS PLLC

(57) ABSTRACT

A method for refitting blade shrouds of a rotor wheel in an aircraft turbomachine is described. The rotor wheel has a disc bearing blades that each have an airfoil extending between a root and a shroud, the shroud of each blade having lateral edges including shapes complementary to the lateral edges of the shrouds of the adjacent blades. The lateral edges of the shrouds are interlocked in engagement with one another such that anti-wear coatings of these edges are in
(Continued)

contact with one another in a desired interlocking engagement position, and at least one of the lateral edges of at least one of the shrouds being able to be disengaged from the lateral edge of an adjacent shroud in an undesired disengagement position. The method includes, when an undesired disengagement position is detected, a step of inserting a re-engagement device into the turbomachine.

8 Claims, 6 Drawing Sheets

(52) U.S. Cl.
CPC .... *F05D 2220/323* (2013.01); *F05D 2230/80* (2013.01); *F05D 2240/24* (2013.01)

(56) References Cited

FOREIGN PATENT DOCUMENTS

| | | | | | |
|---|---|---|---|---|---|
| EP | 3 382 144 A1 | | 10/2018 | | |
| FR | 2 950 104 A1 | | 3/2011 | | |
| JP | 2004121546 A | * | 4/2004 | ......... | A61B 1/00133 |

OTHER PUBLICATIONS

Written Opinion mailed Jun. 14, 2021, issued in corresponding International Application No. PCT/FR2021/050341, filed Mar. 1, 2021, 6 pages.

* cited by examiner

METHOD FOR REFITTING BLADE SHROUDS OF A ROTOR WHEEL IN AN AIRCRAFT TURBOMACHINE

FIELD OF THE DISCLOSURE

The present disclosure relates to a method for refitting vane shrouds of a rotor wheel in an aircraft turbomachine, as well as to a re-engagement device for carrying out such a method.

BACKGROUND

The state of the art is illustrated in document FR-A1-2 950 104.

Classically, a turbomachine axial turbine consists of a succession of axial stages (along the axis of circulation of the gas flows) arranged one behind the other. Each stage comprises a bladed movable wheel forming the rotor and a bladed turbine stator forming the stator. The movable wheel is rotated opposite the corresponding turbine stator.

In the present application, upstream and downstream are defined with respect to the normal flow direction of the air flows (upstream to downstream) through the turbomachine. The axis of rotation of the main rotor of the turbomachine is called the "axis of the turbomachine". The axial direction is the direction of the turbomachine axis, and a radial direction is a direction perpendicular to the turbomachine axis and intersecting this axis. Similarly, an axial plane is a plane containing the axis of the turbomachine, and a radial plane is a plane perpendicular to that axis. The adjectives "inner" and "outer" are used in reference to a radial direction so that the inner part of an element is, along a radial direction, closer to the axis of the turbomachine than the outer part of the same element. The stacking axis of a vane is the axis perpendicular to the axis of the turbomachine, which passes through the center of gravity of the innermost section of the blade of the vane (i.e. the section closest to the axis of the turbomachine). Typically, a turbomachine vane comprises a blade extending along the stack axis of the vane, between the proximal and distal (i.e. inner and outer) ends of the vane.

The movable wheel typically consists of an annular disc centered on the axis of rotation of the wheel, to which a plurality of vanes is attached.

An example of such a vane is shown in FIG. 1. A vane of this type is described in patent document FR-A1-3 079 847. This vane 10 comprises a blade 16 extending along the stacking axis X of the vane, between the proximal 10A and distal 10B ends of the vane 10. At its proximal end 10A, the vane comprises a platform 19 and a root 12 by which it is attached to the disc (not shown). At its distal end 10B, the vane 10 has a shroud 14.

The shroud 14 comprises a platform 20 externally delimiting the flow duct of the gas circulating between the blades 16, and having opposite lateral edges 21, 22. The platform 20 comprises an upstream portion 24 called the "upstream spoiler" and a downstream portion 28 called the "downstream spoiler". The shroud 14 also comprises upstream 31 and downstream 32 sealing lips extending radially outward from the outer face of the platform 20. Each of the platform lateral edges 21, 22 has a substantially "U" shaped profile between the upstream 31 and downstream 32 lips. In the case of other vanes, this profile may take the form of a "Z" or a "V" for example.

In order to dampen the vibrations to which the vanes 10 are subjected during operation and to give rigidity to the assembly, the vanes 10 are mounted on their discs with a torsional stress about a torsional axis positioned in relation to the stacking axis X. The geometry of the shrouds 14 is such that each vane 10 is placed under torsional stress by bearing on the neighboring vanes 10 at the lateral edges 21 and 22. These lateral edges 21, 22 therefore define inter-vane contact surfaces and are the site of significant friction during operation of the turbomachine.

The role of the lateral edges 21, 22, which are maintained in contact by the torsional stressing of the vane, is to dampen the first vibratory bending mode in order to prevent the vane from breaking dynamically, due to a resonance phenomenon. However, during operation, such a moving vane may be subject to interference from other parts and thus not return to its initial assembled position. This can lead to loss of contact between the lateral edges.

Such a loss of contact and the consequent play between the shrouds can cause the vane to become disengaged i.e. the male and female faces which should be in contact are no longer in contact, with an axial offset of the shroud of the vane. This disengagement leads to the removal and dismantling of the engine in order to put the shrouds back in the right position. If such removal and disassembly is not carried out, there is a loss of damping or even a risk of dynamic failure, which in the worst case can lead to an in-flight engine stoppage or partial/full turbine damage in flight. Apart from the risk of failure, there is also the consequence that the parts cannot be repaired and have to be scrapped during the maintenance visit or even before, which has a negative impact on costs.

There is therefore a need for a method of re-housing the vane shrouds of a rotor wheel in an aircraft turbomachine, without the need to remove or dismantle the engine or turbine from the turbomachine.

SUMMARY

The disclosure thus provides a method of refitting vane shrouds of a rotor wheel in an aircraft turbomachine, the rotor wheel comprising a disc bearing vanes that each of which has a blade extending between a root and a shroud, the shroud of each vane comprising lateral edges comprising shapes complementary to the lateral edges of the shrouds of the adjacent vanes, the lateral edges of the shrouds being interlocked in engagement with one another such that anti-wear coatings of these edges contact each other in a desired interlocking engagement position, and at least one of the lateral edges of at least one of the shrouds being able to be disengaged from the lateral edge of an adjacent shroud in an undesired disengagement position.

According to the disclosure, the method comprises, when such an undesired disengagement position is detected, a step of inserting a re-engagement device into the turbomachine, and a step of moving the at least one shroud from this undesired position to the desired interlocking engagement position by bearing on and exerting a force on the vane or each vane whose shroud is disengaged.

Thanks to the insertion of such a re-engagement device in the turbomachine, and to the step of moving the shroud from the undesired position to the desired interlocking engagement position, the method according to the disclosure enables to refit the disengaged moving vane(s) directly under the wing, without the need to dismantle the engine or the turbine of the turbomachine. In this way, it is possible to avoid premature removal or dynamic breakage of the part and therefore of the engine or turbine. The process according to the disclosure therefore maximizes and optimizes the use of the engine, while at the same time ensuring a healthier operation of the moving vanes. Such a process also allows for a reduction in costs (the number of parts to be changed being reduced due to the maximization of part utilization as well as the reduction of anticipated turbine removals), as well as a reduction in the number of repairs to be carried out in maintenance operations.

The method according to the disclosure may comprise one or more of the following features, taken in isolation from each other or in combination with each other:

- the re-engagement device comprises an endoscope;
- the re-engagement device is inserted through an endoscopy port of the turbomachine or through the aft or downstream of the turbomachine;
- the re-engagement device comprises an endoscope comprising lighting and viewing means and clamps or hooks configured to cooperate with the blade or the shroud of one vane to perform the moving step;
- the clamps or hooks are retractable and/or movable relative to each other and/or relative to the endoscope;
- the endoscope comprises clamps which are each configured to grip a leading edge and/or a trailing edge of the blade, or even of an adjacent blade, during the moving step;
- the endoscope comprises a first clamp configured to grip a leading edge of the blade, and a second clamp oriented in a direction different from that of the first clamp and configured to grip a trailing edge of an adjacent blade;
- the endoscope comprises hooks which are each configured to cooperate with a spoiler of a shroud and/or a leading or trailing edge of the blade, or even of an adjacent blade, during the moving step;
- the endoscope comprises a first hook slidably mounted with respect to a second fixed hook of the endoscope;
- the endoscope comprises a member, for example in the form of a roller, this member being rotatable about an axis, the method comprising the engagement of the member between two adjacent blades and the rotation of the member about the axis during the moving step so that the member bears on the two blades and biases them in substantially opposite directions; and
- the endoscope comprises an inflatable member, the method comprising engaging the member between two adjacent blades and inflating the member in the moving step so that the member bears on and biases the two blades in substantially opposite directions.

The present disclosure also relates to a re-engagement device for carrying out the method as described above, wherein it comprises an endoscope comprising lighting and viewing means as well as at least one of the elements selected from:

- clamps and/or hooks configured to cooperate with the blade or the shroud of one vane during the moving step, and
- a movable or inflatable member configured to be engaged between two adjacent blades and to bias them in substantially opposite directions.

DESCRIPTION OF THE DRAWINGS

The disclosure will be better understood and other details, features and advantages of the disclosure will become clearer from the following description made by way of non-limiting example and with reference to the attached drawings in which.

DETAILED DESCRIPTION

Figure 1:
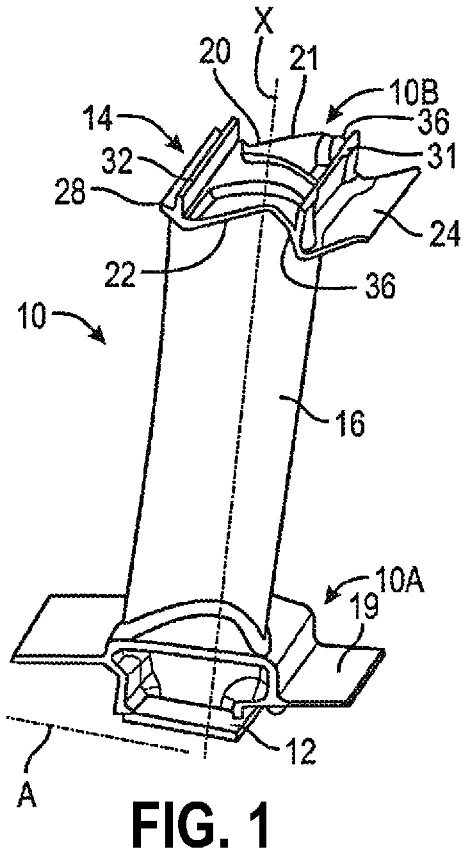
FIG. 1 (PRIOR ART)
FIG. 1 is a schematic perspective view of a turbine movable wheel vane.

The disclosure relates to a method and a re-engagement device 40 for refitting shrouds 14 of vanes 10 of a turbomachine movable wheel. Such a movable wheel (not visible in the figures) forms the rotor of the axial turbine of the turbomachine and is conventionally constituted by an annular disc centered on the axis of rotation of the wheel, to which the vanes 10 are attached. Such a vane 10 is shown in FIG. 1.

The vane 10 comprises a blade 16 extending along the stacking axis X of the vane, between the proximal 10A and distal 10B ends of the vane 10. At its proximal end 10A, the vane comprises a platform 19 and a root 12 by which it is attached to the disc (not shown). At its distal end 10B, the vane 10 has the shroud 14. When several vanes 10 are attached to the disc, their shrouds 14 are arranged edge to edge so as to form a circumferential ring delimiting a surface of revolution about the axis A of rotation of the wheel. The function of this ring is, in particular, to delimit the outer surface of the flow duct of the gas flows circulating between the blades 16 and to limit gas leaks at the distal end 10B of the vanes 10.

The shroud 14 comprises a platform 20 externally delimiting the flow duct of the gas circulating between the blades 16, and having opposite lateral edges 21, 22. The platform 20 comprises an upstream part 24 called "upstream spoiler" and a downstream part 28 called "downstream spoiler". The shroud 14 also includes upstream 31 and downstream 32 sealing lips extending radially outward from the outer face of the platform 20. Each of the platform lateral edges 21, 22 has a substantially "U" shaped profile between the upstream 31 and downstream 32 lips. In the case of other vanes, this profile may take the form of a "Z" or a "V" for example.

Figure 2:
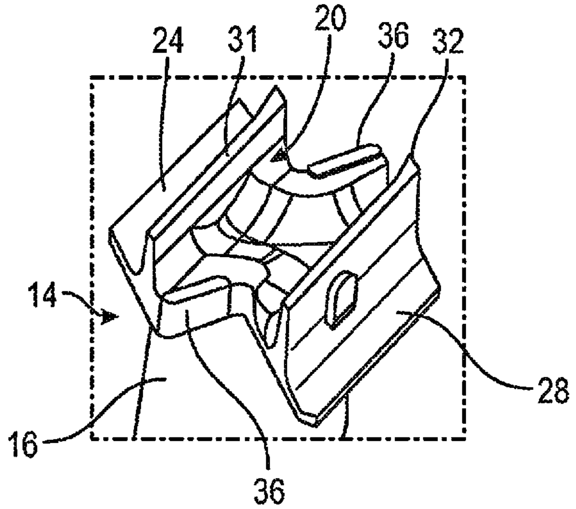
FIG. 2 (PRIOR ART)
FIG. 2 is a larger scale schematic view of a shroud of a turbine movable wheel vane.

In order to dampen the vibrations to which the vanes 10 are subjected during operation and to give rigidity to the assembly, the vanes 10 are mounted on their discs with a torsional stress about a torsional axis positioned in relation to the stacking axis X. The geometry of the shrouds 14 is such that each vane 10 is placed under torsional stress by bearing on the neighboring vanes 10 at the lateral edges 21 and 22. The lateral edges 21, 22 of each vane 10, which comprise complementary shapes to the lateral edges 22, 21 of the shrouds 14 of the adjacent vanes 10, therefore define inter-vane contact surfaces and are the site of significant friction during operation of the turbomachine. In order to be protected against wear, these edges are provided with a coating which is made of anti-wear material resistant to friction. This may, for example, be a material marketed under the brand name STELLITE©. This coating 36 can be seen in FIG. 2.

Typically, this anti-wear coating 36 is deposited on the lateral edges 21, 22 by welding, for example by drop welding, involving the creation of an electric arc to melt the material. This is often a manual operation, with the STELLITE© alloy in the form of a liquid drop during deposition.

STELLITE© alloy is a steel alloy with a high chromium (Cr) and cobalt (Co) content. It may also contain a small amount of tungsten (W) or molybdenum (Mo) and a small amount of carbon (C). STELLITE© alloy is not forgeable and must be either cast or welded onto an object of which it forms a part or into which it is inserted. The lateral edges 21, 22 of the shrouds 14 are interlocked in engagement with one another such that the anti-wear coatings 36 on the edges 21, 22 contact each other in a desired interlocking engagement position.

However, in operation, the vanes 10 may experience interference from other parts and at least one of the vanes 10 may not return to its original assembled position. This can cause loss of contact between adjacent lateral edges 21, 22. Such a loss of contact and the consequent play between the shrouds 14 may cause one vane to become disengaged, i.e. the male and female faces which should be in contact are no longer in contact, with an axial offset of the vane shroud. For the remainder of the description, it will be assumed that the shroud 14A of a vane 10A (shown in FIGS. 14 and 15) is disengaged from its normal interlocking engagement position.

Figure 3:
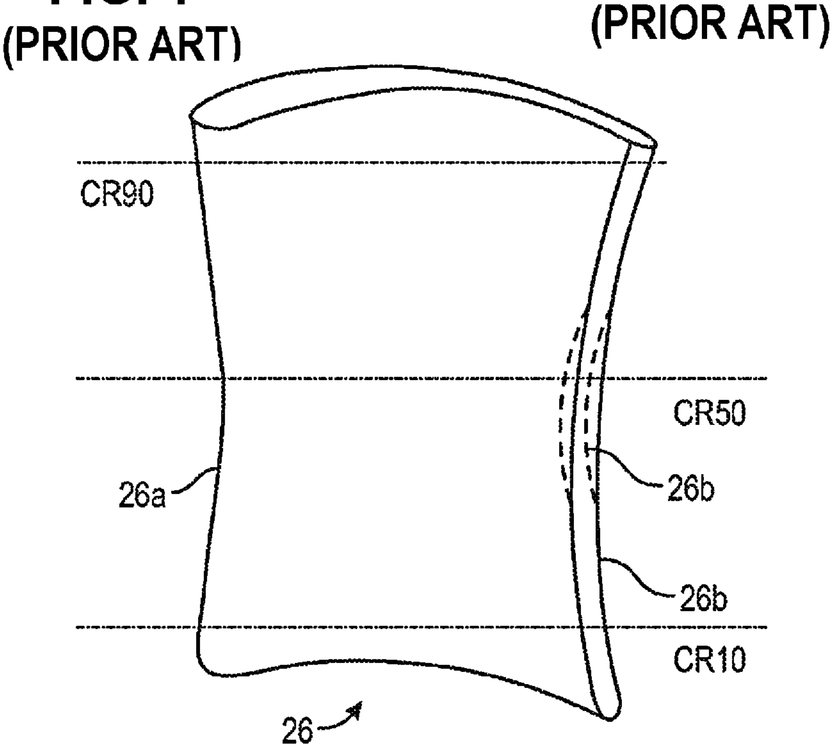
FIG. 3 (PRIOR ART)
FIG. 3 is a very schematic perspective view of a blade of a turbomachine vane.

FIG. 3 shows the leading edge 26*a* and trailing edge 26*b* of a blade 26.

References CR10, CR50 and CR90 in FIG. 3 refer to heights in the gas flow duct in which the blade 26 is intended to extend. CR50 refers to the mid-height of the duct and is therefore located on a circumference centered on the axis of revolution of the duct and located midway between the outer and inner peripheries of the duct. CR10 is located on a circumference centered on the axis of revolution of the duct and located at 10% of the duct height, measured from its inner periphery. CR90 is located on a circumference centered on the axis of revolution of the duct and located at 90% of the duct height, measured from its inner periphery.

The re-engagement device 40 comprises an endoscope 42.

Figure 4:
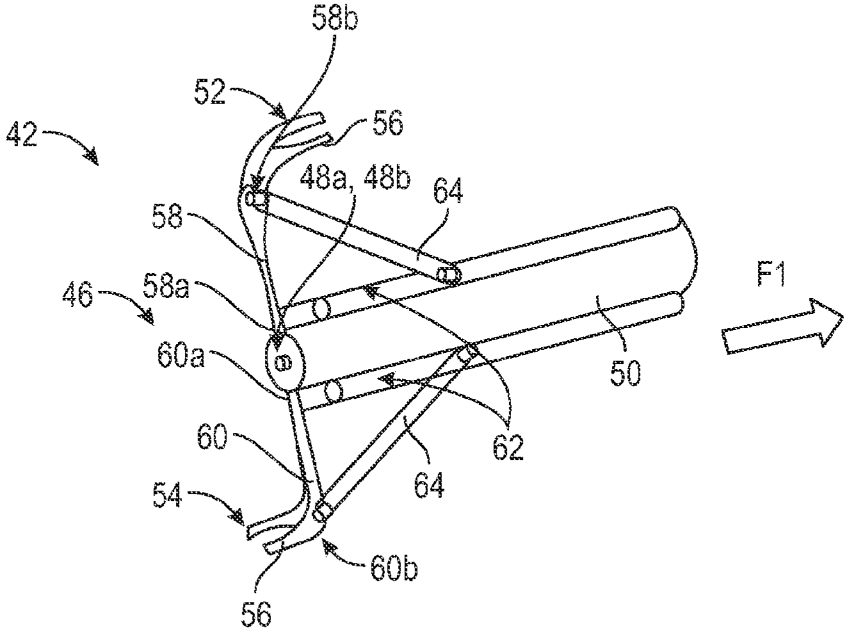
FIG. 4 is a schematic perspective view of the distal end of a re-engagement device according to a first embodiment of the disclosure, in the deployed position.
Figure 5:
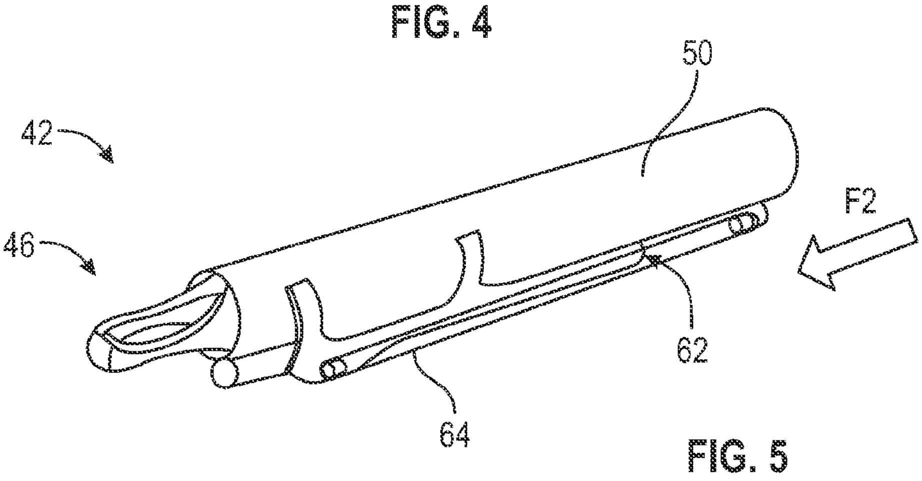
FIG. 5 is a schematic perspective view of the distal end of the re-engagement device of FIG. 4, in the stowed position.

FIGS. 4 and 5 illustrate a first embodiment of the endoscope 42 according to the disclosure.

The endoscope 42 has a generally elongated shape and is preferably flexible. It comprises a proximal end located on the operator's side, and a distal end which must be located as close as possible to the vane to be re-engaged, only this distal end being represented in the drawings. This distal end comprises a head 46.

The endoscope 42 is equipped with optical elements for illumination and visualization, such as a first optical fiber, a proximal end of which is connected to a camera and a distal end 48*a* of which opens onto at least one lens, for example at the level of the head 46, and a second optical fiber, a proximal end of which is connected to a light source and a distal end 48*b* of which opens at the level of the head 46.

The head 46 is located at one end of a body 50 of the endoscope 42. This body 50 is generally tubular in shape and is used in particular to support positioning clamps 52, 54.

In the example shown, the endoscope 42 comprises two positioning clamps 52, 54. The two positioning clamps 52, 54 are oriented in an inverted manner with respect to the direction of extension of the body 50. The clamps 52, 54 have jaws 56 or fixed jaws. The clamps 52, 54 each have a general V-shape with the angle between the jaws 56 determined so that the clamps can be engaged on the leading edge 26*a* or trailing edge 26*b* of a blade. More specifically, a first clamp 52 is configured to grip the leading edge 26*a* of a blade, while the second clamp 54 is configured to grip the trailing edge 26*b* of an adjacent blade, or vice versa.

The clamps 52, 54 have free ends which are advantageously each equipped with a contact element which is preferably made of a material which is not likely to damage the blade during contact. This is, for example, PTFE or any other plastic material, or Teflon.

The clamps 52, 54 are each carried by a separate retractable arm 58, 60. Each retractable arm 58, 60 is straight in shape and comprises a longitudinal end 58*a*, 60*a* hinged to the head 46 or body 50, and an opposite longitudinal end 58*b*, 60*b* where the corresponding clip 52, 54 is located.

Each clamp 52, 54 may be formed in one piece with its corresponding arm 58, 60, but may also be movable along the arm 58, 60 to allow its position to be adjusted to best suit each vane. They extend in an opposite direction, substantially parallel to the direction of extension of the body 50. The jaws 56 of each clamp 52, 54 lie in planes parallel to each other.

Each arm 58, 60 is movable from a deployed position shown in FIG. 4, in which it extends substantially perpendicular to the direction of extension of the body 50, to a stowed position, shown in FIG. 5, in which it extends parallel to that direction of extension and along the body 50.

The movement of each arm 58, 60 is here provided by two corresponding rods 62, 64. Each first rod 62 extends along the direction of extension of the body 50 and comprises a longitudinal end articulated to the end 60*a* of the arm 60, and an opposite longitudinal end connected to a traction member accessible by the user or controlled by the user, from the proximal end of the endoscope 42. Such a pulling member is, for example, a jack (not shown in the drawings). Each second rod 64 extends obliquely between a first rod 62 and the corresponding arm 58, 60, and comprises a longitudinal end hinged to the end 60*b* of the arm, and an opposite longitudinal end hinged to the rod 62, in the vicinity of its end connected to the traction member.

When a tensile force according to arrow F1 is applied to the end of each rod 62 connected to the traction member, the rods move away from the distal end of the endoscope and drag the rods 64 and the arms 58, 60 along with them, which are then moved from the position in FIG. 4 to the position in FIG. 5. A pushing force according to arrow F2 on each rod 62 allows the arms 58, 60 to be redeployed.

Preferably, the distance between the clamps 52, 54 corresponds to the distance between CR10 and CR90.

In use, the endoscope 42 may be inserted in a first step through an endoscopy port of the turbo machine, or through the rear or downstream of the turbo machine in the case of rear stages. Once inserted and in its deployed position, the endoscope 42 can be used in the following manner in a second step: a first clamp 52 is used to clamp the leading edge 26*a* of the blade of the disengaged vane in CR10, while the second clamp 54 is used to pull or push the trailing edge 26*b* of an adjacent blade in CR90, in order to re-engage the disengaged vane shroud. Thus, in this second step, the shroud is moved via the joint action of the clamps 52, 54, to bring it from its disengaged position to a desired interlocking engagement position.

FIGS. 6 to 13 illustrate a second embodiment of the endoscope 42 according to the disclosure.

The endoscope 42 has a generally elongated and preferably cylindrical shape. The endoscope 42 comprises a proximal end located on the operator's side, and a distal end which is to be located as close as possible to the vane to be re-engaged, only this distal end being represented in the drawings. This distal end comprises hooks 66. The endoscope 42 further comprises means 68, 70, 72, 74, 76, 78 for transmitting a generally axial mechanical force (along the motor axis) between the hooks 66.

In the particular embodiment illustrated in FIGS. 6 to 13, the distal end of the endoscope 42 comprises two hooks 66. Each of the hooks 66 is configured to bear on a spoiler 24, 28 of a shroud 14, or a leading edge 26*a* or trailing edge 26*b* of a blade. The surface of the hooks 66 is coated with a material which is not likely to damage the blades 16 on contact. This may be PTFE or any other plastic material, or Teflon.

Figure 6:
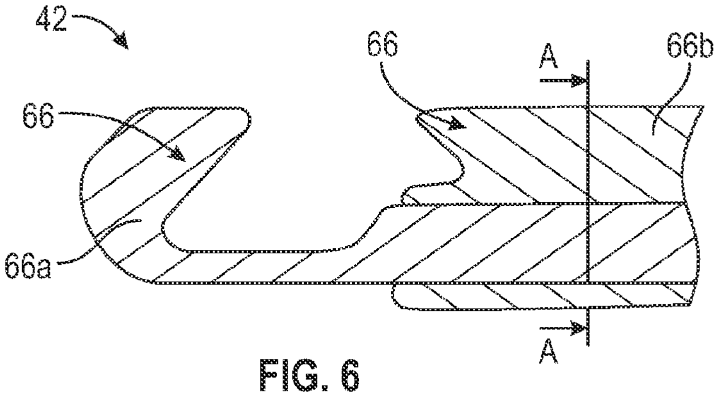
FIG. 6 is a side view of the distal end of a re-engagement device according to a second embodiment of the disclosure, the distal end comprising two hooks according to a first embodiment.
Figure 7:
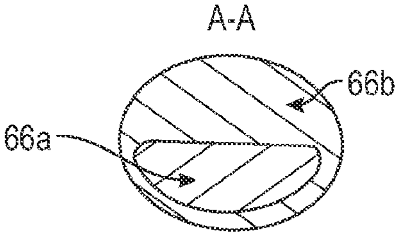
FIG. 7 is a cross-sectional view, taken along a sectional plane A-A, of the distal end of the re-engagement device of FIG. 6.
Figure 8:
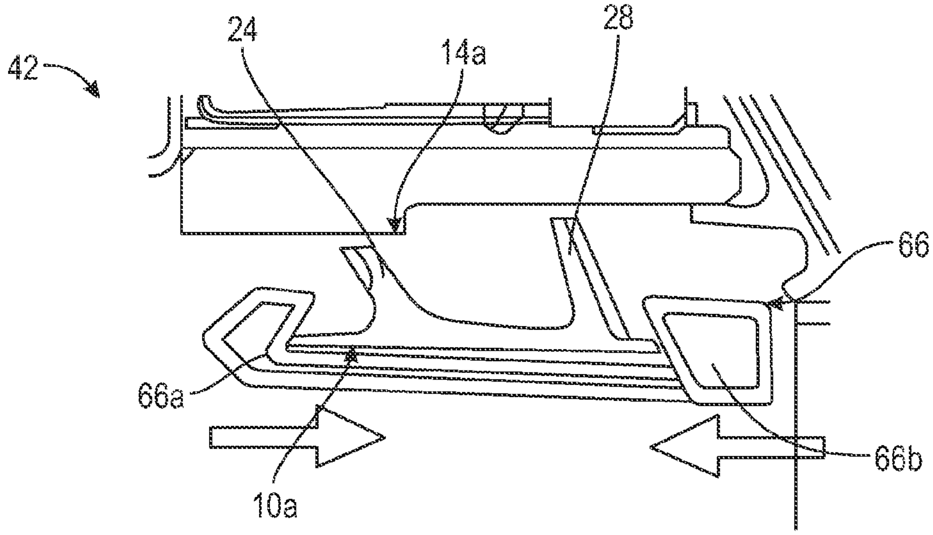
FIG. 8 is a schematic view of the distal end of the re-engagement device of FIG. 6.

According to a first variant, illustrated in FIGS. 6 to 8, the two hooks 66 extend in the same plane and are oriented in the same direction with respect to the direction of extension of the endoscope body 42. According to this variant, the two hooks 66 are configured to bear on respective spoilers 24, 28 of two adjacent vane shrouds 10, including the vane 10*a* comprising the disengaged shroud 14*a*, and thus exert a generally axial force at the top part on these two vanes. More precisely, a first hook 66*a* is configured to bear on the upstream spoiler 24 of the disengaged shroud 14*a*, and a second hook 66*b* is configured to bear on the downstream spoiler 28 of the shroud of an adjacent vane, or vice versa. Such a first embodiment is particularly suitable for a slightly inclined gas flow duct.

Figure 9:
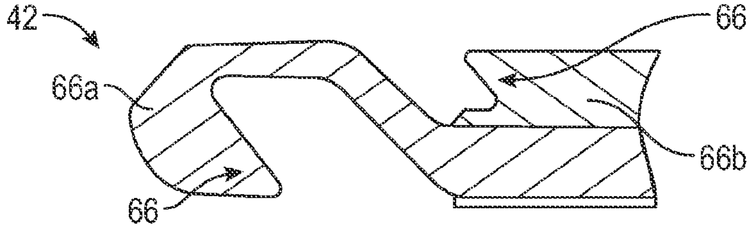
FIG. 9 is a view similar to that of FIG. 6, the distal end comprising two hooks according to a second embodiment.

According to a second alternative embodiment, illustrated in FIG. 9, the two hooks 66 extend in the same plane and are oriented in opposite directions with respect to the direction of extension of the body of the endoscope 42. According to this embodiment, a first hook 66*a* is configured to bear on the leading edge of the blade of the disengaged vane, and a second hook 66*b* is configured to bear on the trailing edge of the blade of an adjacent vane, or vice versa.

Figure 10:
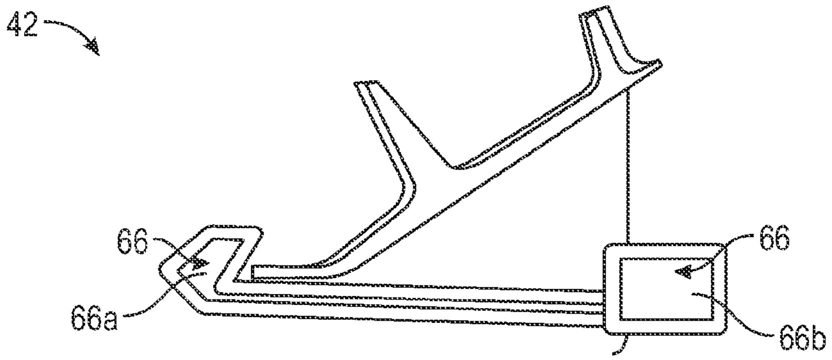
FIG. 10 is a similar view to FIG. 8, the distal end comprising two hooks in a third embodiment.
Figure 11:
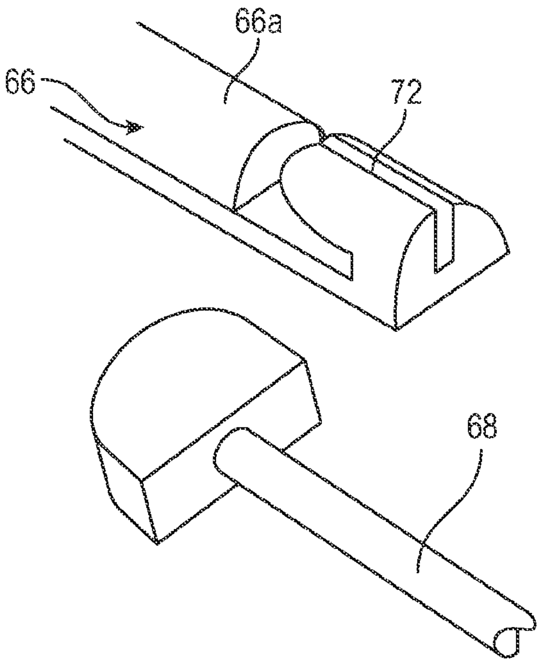
FIG. 11 is a perspective view of the underside of first means for transmitting a mechanical force between the two hooks of the re-engagement device according to the second embodiment of the disclosure, the first means comprising a cable.
Figure 12:
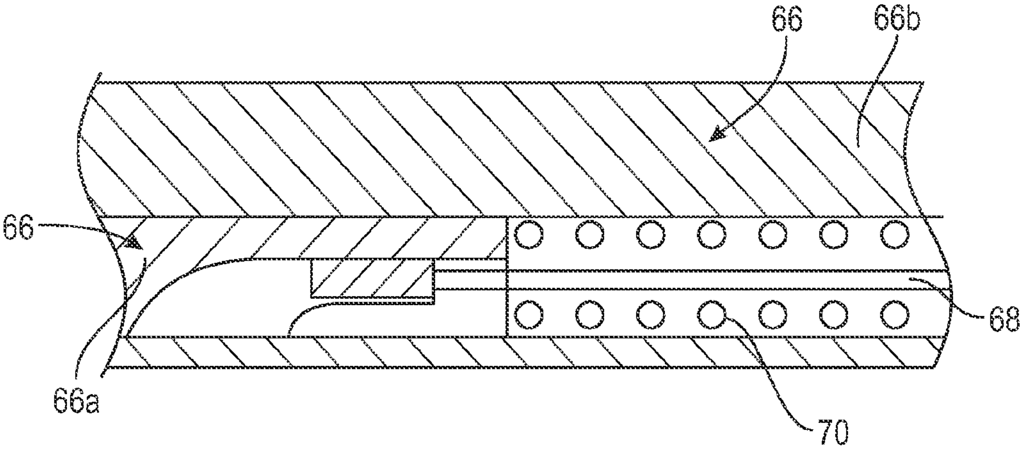
FIG. 12 is a vertical sectional view, taken at the level of the cable attachment, of one of the two hooks of FIG. 11.

According to a third embodiment, illustrated in FIG. 10, the two hooks 66 extend in substantially perpendicular planes. The two hooks 66 are thus offset by a quarter turn with respect to the direction of extension of the body of the endoscope 42. According to this variant, a first hook 66*a* is configured to bear on the upstream spoiler 24 of the disengaged shroud 14*a*, and a second hook 66*b* is configured to bear on the trailing edge 26*b* of the blade of an adjacent vane 10, or vice versa. Such a third alternative embodiment is particularly suitable for a strongly inclined gas flow duct.

Preferably, as illustrated in FIG. 7, one of the two hooks 66, for example the first hook 66*a*, has a half-moon profile. This ensures the respective angular position of the two hooks 66.

Even more preferably, as illustrated in FIGS. 8 and 10, one of the two hooks 66*a*, 66*b* is slidably mounted with respect to the other hook 66*b*, 66*a* which is fixed with respect to the body of the endoscope 42. To this end, according to a first alternative embodiment shown in FIGS. 11 and 12, the means for transmitting an axial force between the hooks comprise a cable 68. Preferably, according to this variant, the means for transmitting an axial force also comprise a spring 70 compressed in abutment on the hooks 66. Such a spring 70, which is visible in FIG. 12, enables to maintain the hooks 66 in a free state in the open position, when the endoscope 42 is inserted into the turbomachine.

The cable 68 is attached at one end to the slidably mounted hook and is intended to be actuated by an operator of the endoscope 42 to exert the generally axial force between the two hooks 66. In the example shown, the cable 68 is attached to the first hook 66*a* via a planar support, typically via a slider 72 provided on the first hook 66*a*.

Figure 13:
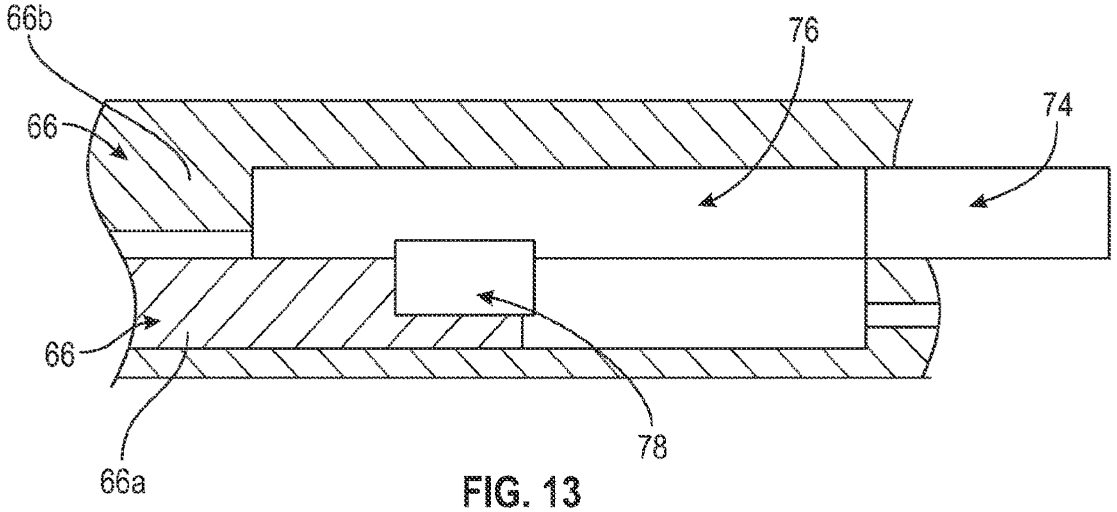
FIG. 13 is a vertical sectional view of second means for transmitting a mechanical force between the two hooks of the re-engagement device according to the second embodiment of the disclosure.

According to a second embodiment shown in FIG. 13, the means for transmitting an axial force between the hooks comprises an electric motor 74, a helical screw 76, and a rack 78. The electric motor 74 is integral with one of the two hooks, for example the second hook 66*b* in the example shown (this second hook 66*b* being the fixed hook in this example). The rack 78 is attached to the other hook, for example the first hook 66*a* in the example shown. The helical screw 76 connects the electric motor 74 to the rack 78, and thus allows axial translational movement of the first hook 66*a* relative to the second hook 66*b*.

In use, the endoscope 42 may be inserted in a first step through an endoscopy port of the turbomachine, or through the rear or downstream of the turbomachine in the case of rear stages. During this first step, the hooks 66 are positioned so as to bear on a spoiler 24, 28 of the disengaged shroud 14*a*, or a leading edge 26*a* or trailing edge 26*b* of a blade. Once the endoscope 42 has been inserted and the hooks 66 correctly positioned, the endoscope 42 can be used in the following manner in a second step: a generally axial mechanical force is applied to the hooks 66, and thus to the adjacent vanes 10 on which the hooks 66 are positioned, via means 68, 70, 72, 74, 76, 78. Thus, during this second step, the disengaged shroud 14*a* is moved via the joint action of the hooks 66, to bring it from its disengaged position to a desired interlocking engagement position.

Figure 14:
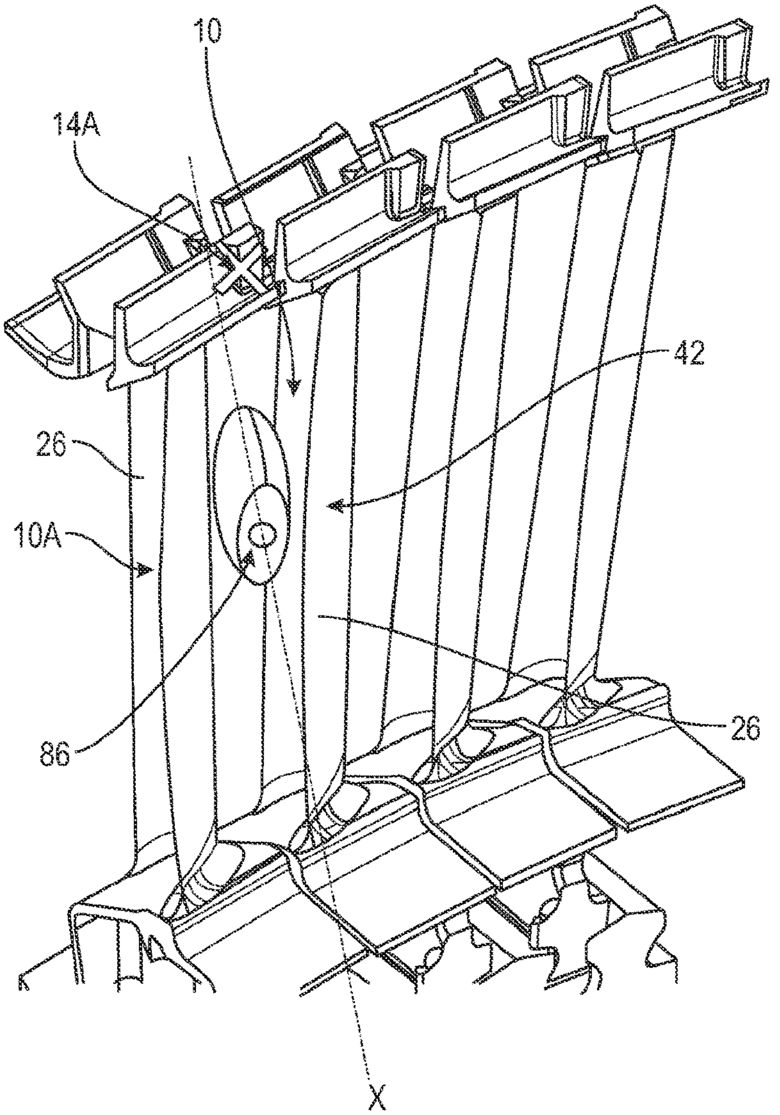
FIG. 14 is a schematic perspective view of the distal end of a re-engagement device according to a third embodiment of the disclosure, in the insertion position between two rotor vanes.
Figure 15:
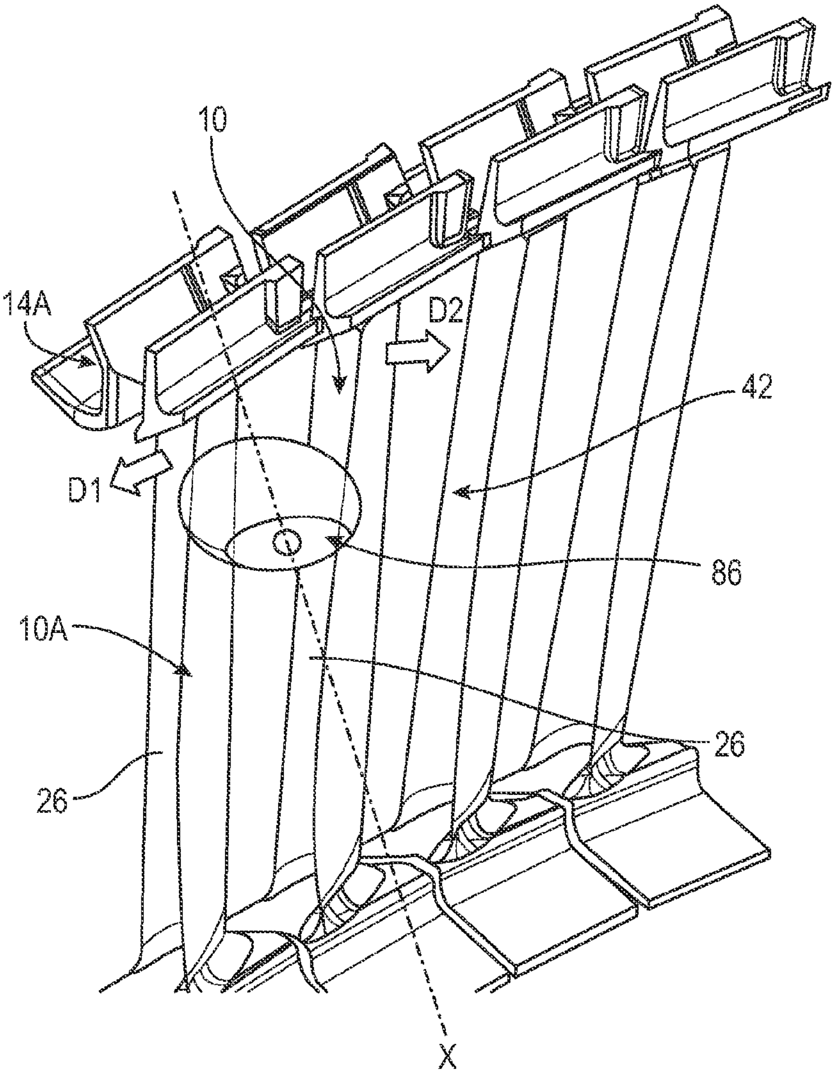
FIG. 15 is a schematic perspective view of the distal end of re-engagement device of FIG. 14, in the position of re-engaging the shroud of one of the vanes.

FIGS. 14 and 15 illustrate a third embodiment of the endoscope 42 according to the disclosure.

The endoscope 42 comprises a proximal end located on the operator's side, and a distal end which is to be located as close as possible to the vane 10A to be refitted, only this distal end being shown in the drawings. This distal end comprises a member 86 which is rotatable about an axis X.

In the particular embodiment shown in FIGS. 14 and 15, the member 86 is in the form of a roller. The endoscope 42 also comprises lighting and viewing means, such as a light source and a camera, for example, such means not being shown in FIGS. 14 and 15 for clarity. The endoscope 42 also comprises means for rotating the member 86 about its axis X. Such means of rotation (not shown in the drawings) are, for example, constituted by a braided cable system connecting the member 86 to a crank handle opposite it. In this case, the rotation of the member 86 about its axis X is carried out manually by an operator, via the crank. Alternatively, the rotation means may comprise an electric motor, either directly connected to the member 86 by a spline system, or remote and connected to a braided cable. In this case, the member 86 is rotated about its axis X electrically via the motor. Alternatively, the rotation means may comprise a centrifugal wheel system connected to the member 86, and to which air pressure is applied. In the latter case, the rotation of the member 86 about its axis X is effected pneumatically.

The member 86 is preferably made of a material which is not likely to damage the blades 16 on contact. This is, for example, PTFE or any other plastic material, or Teflon. When the member 86 is in the form of a roller, the latter has a substantially elliptical shape, which is defined according to the stage of the turbomachine in which the roller is to be used. Preferably, the roller 86 has an elliptical shape with a small width of substantially 7 mm and a large width of between 15 mm and 30 mm. The dimensions of the roller 86 are also chosen to be compatible with the dimensions of the endoscopy port of the turbomachine.

In use, the endoscope 42 may be inserted in a first step through an endoscopy port of the turbomachine, or through the rear or downstream of the turbomachine in the case of rear stages. During this first step, and as illustrated in FIG. 14, the roller 86 is positioned in its small width between two adjacent blades 16 of two vanes 10, of which the vane 10A comprises the disengaged shroud 14A. To do this, a mechanical force is applied by the roller 86 on the two blades 16 when it is inserted, via the endoscope 42, so as to move the two corresponding vanes 10 apart. Once inserted, and as illustrated in FIG. 15, the endoscope 42 can be used in the following way in a second step: the roller 86 is rotated about its axis X by the rotating means so as to push the two blades 16 to pass its large width. The roller 86 is thus supported on the two blades 16 and pushes them in substantially opposite directions D1, D2. This movement of the roller 86 enables to move the two corresponding vanes 10 in a tangential direction, which gives the disengaged vane 10A more freedom to return to its normal position. In this way, the shroud 14A is moved via the action of the member 86, in order to bring it from its disengaged position to a desired interlocking engagement position.

Figure 16:
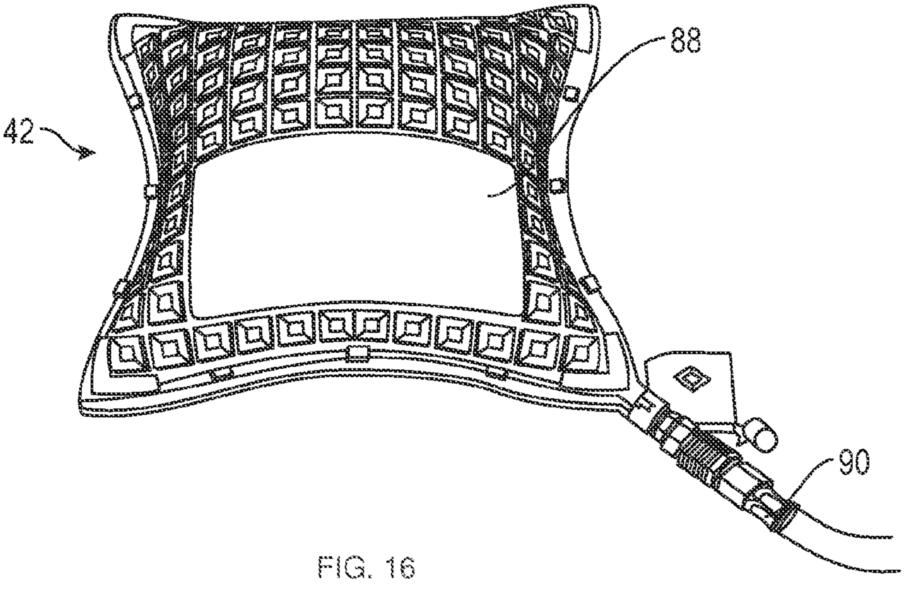
FIG. 16 is a perspective view of the distal end of a re-engagement device according to a fourth embodiment of the disclosure.

FIG. 16 illustrates a fourth embodiment of the endoscope 42 according to the disclosure.

The endoscope 42 comprises a proximal end located on the operator's side, and a distal end which must be located as close as possible to the vane to be re-engaged, only this distal end being shown in FIG. 16. This distal end comprises an inflatable member 88.

In the particular embodiment shown in FIG. 16, the member 88 is in the form of a pneumatic cushion. Preferably, the pneumatic cushion 88 is made of a flexible, waterproof material, such as rubber. The endoscope 42 also comprises lighting and viewing means, such as for example a light source and a camera, such means not being shown in FIG. 16 for clarity. The endoscope 42 also comprises air supply means for supplying air to the inflatable member 88. Such means comprise, for example, an air channel 90 extending axially through the body of the endoscope 42.

In use, the endoscope 42 may be inserted in a first step through the aft or downstream of the turbine of the turbomachine for the aft stages. In this first step, the inflatable member 88 is positioned between two adjacent blades of two vanes, the vane of which comprising the shroud disengaged. Once inserted, the endoscope 42 can be used in the following manner in a second step: the inflatable member 88 is inflated via the air supply means. Under the pressure of the air blown into it, the inflatable member 88 thus comes to bear on the two adjacent blades and biases them in substantially opposite directions. This inflation of the member 88 allows the two corresponding vanes to be moved in a tangential direction, which gives the disengaged vane more freedom to return to its normal position. In this way, the shroud is moved by the action of the member 88 from its disengaged position to a desired interlocking engagement position.

The use of such an endoscope 42 having an inflatable member 88 has the advantage that it does not require the operator to use any special handling system for the member 88, but simply to operate the air supply means.

It is therefore understood that the refitting method and re-engagement device 40 according to the disclosure allows for the refitting of vane shrouds of a rotor wheel in an aircraft turbomachine, without the need to remove or dismantle the engine or turbine of the turbomachine. In this way, it is possible to avoid early removal or dynamic failure of the vanes and thus of the engine or turbine. The method and device according to the disclosure therefore maximize and optimize the use of the engine, while at the same time ensuring a healthier operation of the moving vanes. In addition, they allow a reduction in costs, as well as a reduction in the number of repairs to be carried out in maintenance operations.

The invention claimed is:

1. A method of refitting vanes shrouds of a rotor wheel in an aircraft turbomachine, the rotor wheel comprising a disc bearing vanes that each comprise a blade extending between a root and a shroud, the shroud of each vane comprising lateral edges comprising shapes complementary to the lateral edges of the shrouds of the adjacent vanes, the lateral edges of the shrouds being interlocked in engagement with one another such that anti-wear coatings of these edges contact each other in a desired interlocking engagement position, and at least one of the lateral edges of at least one of the shrouds being configured to be disengaged from the lateral edge of an adjacent shroud in an undesired disengagement position, the method comprising, when such an undesired disengagement position is detected, a step of inserting a re-engagement device into the turbomachine, and a step of moving the at least one shroud from this undesired position to the desired interlocking engagement position by bearing on and exerting a force on the vane or each vane whose shroud is disengaged, the re-engagement device comprising an endoscope that includes at least two clamps configured to cooperate with the blade or the shroud of one vane to perform the moving step, wherein the clamps are each configured to grip a leading edge and/or a trailing edge of the blade, or even of an adjacent blade, during the moving step, a first clamp being configured to grip a leading edge of the blade, and a second clamp being oriented in a different direction from that of the first clamp and configured to grip a trailing edge of an adjacent blade.

2. The method according to claim 1, wherein the re-engagement device is inserted through an endoscopy port of the turbomachine or through the aft or downstream of the turbomachine.

3. The method according to claim 1, wherein the endoscope further includes lighting and viewing means.

4. The method according to claim 1, wherein the clamps or hooks are retractable and/or movable relative to each other and/or relative to the endoscope.

5. A method of refitting vanes shrouds of a rotor wheel in an aircraft turbomachine, the rotor wheel comprising a disc bearing vanes that each comprise a blade extending between a root and a shroud, the shroud of each vane comprising lateral edges comprising shapes complementary to the lateral edges of the shrouds of the adjacent vanes, the lateral edges of the shrouds being interlocked in engagement with one another such that anti-wear coatings of these edges contact each other in a desired interlocking engagement position, and at least one of the lateral edges of at least one of the shrouds being configured to be disengaged from the lateral edge of an adjacent shroud in an undesired disengagement position, the method comprising, when such an undesired disengagement position is detected, a step of inserting a re-engagement device into the turbomachine, and a step of moving the at least one shroud from this undesired position to the desired interlocking engagement position by bearing on and exerting a force on the vane or each vane whose shroud is disengaged, the re-engagement device comprising at least two hooks configured to cooperate with the blade or the shroud of one vane to perform the moving step, wherein the hooks are each configured to cooperate with a spoiler of a shroud and/or a leading or trailing edge of the blade, or even of an adjacent blade, during the moving step, a first of the hooks being slidably mounted with respect to a second of the hooks, which is fixed.

6. A method of refitting vanes shrouds of a rotor wheel in an aircraft turbomachine, the rotor wheel comprising a disc bearing vanes that each comprise a blade extending between a root and a shroud, the shroud of each vane comprising lateral edges comprising shapes complementary to the lateral edges of the shrouds of the adjacent vanes, the lateral edges of the shrouds being interlocked in engagement with one another such that anti-wear coatings of these edges contact each other in a desired interlocking engagement position, and at least one of the lateral edges of at least one of the shrouds being configured to be disengaged from the lateral edge of an adjacent shroud in an undesired disengagement position, the method comprising, when such an undesired disengagement position is detected, a step of inserting a re-engagement device into the turbomachine, and a step of moving the at least one shroud from this undesired position to the desired interlocking engagement position by bearing on and exerting a force on the vane or each vane whose shroud is disengaged, the re-engagement device comprising at least one of the elements selected from:

a rotatable member configured to be engaged between two adjacent blades and to bias them in opposite directions to perform the moving step, wherein the rotatable member is rotatable about an axis, the method comprising engaging the rotatable member between two adjacent blades and rotating the rotatable member about said axis during the moving step so that the member bears on the two blades and biases them in opposite directions, and an inflatable member configured to be engaged between two adjacent blades and to bias them in opposite directions to perform the moving step, wherein the inflatable member is configured to be engaged between two adjacent blades and to bias them in opposite directions to perform the moving step.

7. The method according to claim 6, wherein the method comprising engaging the inflatable member between two adjacent blades and inflating the inflatable member in the moving step so that the member bears on and biases the two blades in opposite directions.

8. The method according to claim 6, wherein the rotatable member is in the form of a roller.

* * * * *